Dec. 5, 1933.  M. PIER  1,938,086
PRODUCTION OF VALUABLE HYDROCARBONS
Filed Sept. 30, 1929
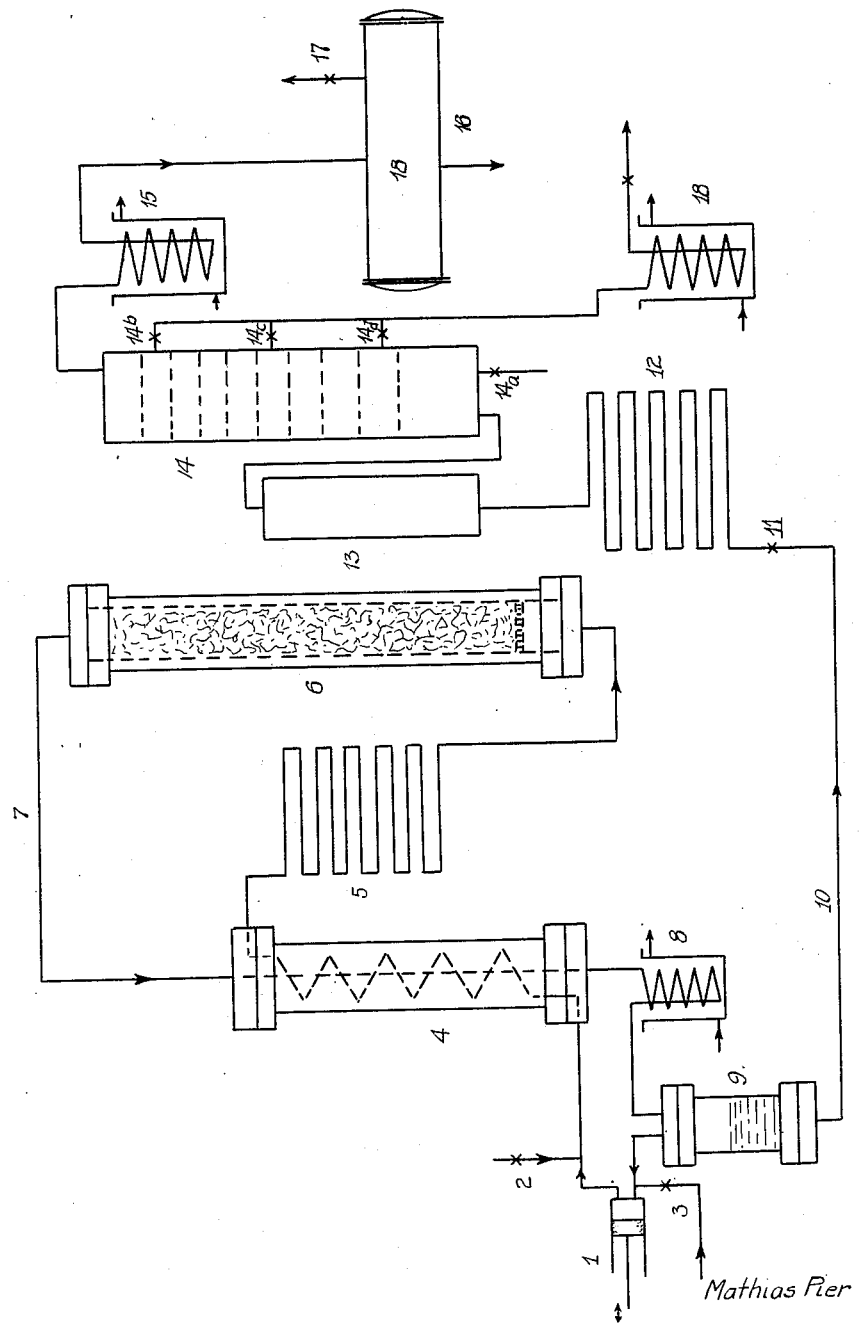
Mathias Pier
INVENTOR
BY Hauff ell Varland
ATTORNEYS Patented Dec. 5, 1933

1,938,086

UNITED STATES PATENT OFFICE 1,938,086

PRODUCTION OF VALUABLE HYDRO-CARBONS

Mathias Pier, Heidelberg, Germany, assignor to I. G. Farbenindustrie Aktiengesellschaft, Frankfort-on-the-Main, Germany, a corporation of Germany Application September 30, 1929, Serial No. 396,389, and in Germany October 4, 1928

13 Claims. (Cl. 196—50)

This invention relates to the production of valuable hydrocarbons from liquid carbonaceous materials, such as coal pastes, mineral oils, tars and the like, and the distillation products, conversion products and residues thereof, which initial materials contain sulphur compounds or oxygen compounds or both.

The process according to the present invention is in particular applicable to the production of hydrocarbons of lower boiling point range from hydrocarbon products of higher boiling point range, such as gas oils or middle oils or the like, containing sulphur compounds or oxygen compounds, and in particular for the cracking of mineral oils from Venezuela, Mexico or Texas, in the cracking of which considerable commercial difficulties have been encountered.

It is known that the cracking of hydrocarbons can only be carried out with difficulty, and in any event uneconomically, if the said products contain an undue proportion of compounds of sulphur and oxygen. These initial materials are, in many instances, also so thick and viscous that they can only be distilled with difficulty, if at all. For the same reason it is difficult, or even impossible, to pass them through pipes. Further an excessive content of sulphur renders cracking practically impossible owing to the rapid destruction of the apparatus by corrosion.

I have now found that the said initial materials containing compounds of oxygen or of sulphur can be cracked in an excellent and economical manner by heating them in the liquid state in the presence of the catalysts herein specified and then subjecting the products thus obtained to cracking. The said catalysts may be employed dispersed in the materials under treatment, or they may be rigidly arranged in the reaction vessels. The said heat treatment may be carried out without an addition of hydrogen or in the presence of gases free from uncombined hydrogen and which do not supply uncombined hydrogen under the conditions of working. As examples of gases which may be added may be mentioned sulphur dioxide, ammonia, nitrogen, oxides of nitrogen, carbon monoxide, carbon dioxide and hydrogen chloride, such conditions being employed that the said hydrogen chloride does not give rise to the formation of hydrogen. The said heat treatment is carried out at such temperatures and under such pressures that the main portion of the materials under treatment remains liquid. For example temperatures of between 300° and 450° C. are employed, but higher or lower temperatures may be employed according to the boiling point of the initial materials. The pressures employed may be of any desired order. Thus, for example, atmospheric pressure may be employed or pressures of up to 50, 100, 150 atmospheres or even more. In the said heat treatment in the presence of catalysts the oxygen and sulphur compounds may be simply distilled off, or they are decomposed to products of lower boiling point, which are then in turn distilled off. Catalysts particularly coming into question in accordance with the present invention are those comprising metals belonging to the 6th or 7th group of the periodic system or cobalt as such or in the form of their compounds, or mixtures thereof with one another or with other substances, either alone or deposited on carriers. Catalysts comprising tungsten, molybdenum, chromium, uranium, manganese or cobalt or compounds thereof are very advantageous, and particularly good results have been obtained with those catalysts, which in destructive hydrogenation processes are known to be immune from poisoning by sulphur. As examples of mixed catalysts may be mentioned such obtained from molybdic acid and zinc oxide, or such comprising molybdenum and chromium, or molybdenum and tungsten, or which are prepared from molybdic acid, zinc oxide and magnesia.

In the said cracking treatment addition of hydrogen or gases supplying hydrogen has proved to be entirely unnecessary. Usually temperatures ranging between about 350° and 650° C. are employed in the said process, and preferably of between 400° and 500° C. It is advantageous to add splitting catalysts, such as bauxite, kaolin, Florida earth, silica gel, aluminium oxide and the like, or also catalysts, such as are known to be suitable in destructive hydrogenation processes.

Operating in two stages, as described and claimed in the present application, has the great advantage that such initial materials are rendered available for cracking, as could according to the methods hitherto known not be treated in this manner. Moreover, the low boiling products obtained may often be employed without any further refinery and in any case, if a refinery should prove necessary, this can be carried out in a very simple manner, since the products contain only very little oxygen and sulphur. Moreover, since in the first stage of the process the products are substantialy freed from compounds of oxygen and sulphur, no difficulties owing to the polymerization and the formation of coke occur in the cracking stage, in which undesirable reactions are initiated by the presence of the said compounds. Furthermore, the products obtained according to the present invention do not become dark in storage. The first stage of the said process, in which the compounds of oxygen and sulphur are removed, is usually carried out under such conditions that no substantial disruption of the molecule of the hydrocarbon constituents takes place.

The following example will further illustrate the nature of this invention and how it may be carried out in practice with reference to the accompanying drawing. The drawing illustrates in elevation and partly in vertical section in a diagrammatic manner an apparatus suitable for carrying out the process according to the present invention. It should, however, be understood that the invention is not limited to the specific example given nor to operations carried out in the specific form of apparatus illustrated.

Referring to the drawing an American gas oil containing about 1.2 per cent of sulphur is introduced through the pipe 2 into the process under a pressure of about 100 atmospheres and is admixed with ammonia introduced through the pipe 3. The mixture is pumped by means of the booster pump through the heat regenerator 4 and is thereupon heated to a temperature of about 400° C. in a preheating coil 5. The mixture is then passed into the reaction vessel 6 containing a catalyst prepared from molybdic acid and zinc oxide in which vessel it remains for a period not exceeding one minute. In this manner the sulphur is removed to the extent of about 50 per cent from the oil and no substantial disruption of the molecule of the hydrocarbon constituents takes place. The purified products pass off through the pipe 7 to the heat regenerator 4 and thence to the condenser 8. They are then passed to the stripping vessel 9 in which the ammonia gas is separated from the purified gas oil which collects in the said separator. The said gas oil is thereupon passed off by means of the pipe 10 through the pressure release valve 11 into the preheating coil 12 in which it attains a temperature of between 440° and 460° C. and thence into the soaker 13. In the said soaker the material is converted to the extent of about 50 per cent into motor fuel, a far smaller deposition of coke being obtained than is the case when cracking a product from which the sulphur has not been removed. The products issuing from the soaker are passed into the bubble tower 14 from which the separate fractions are withdrawn out to the outlets 14a, 14b, 14c and 14d. The products issuing from the outlets 14b, 14c and 14d are passed to the condenser 18. The products which are still gaseous issuing from the bubble tower are passed through the condenser 15 and the highly volatile liquid products are collected in the drum 18. The permanent gases may be withdrawn through the pipe 17, whereas the liquid products are withdrawn at 16.

What I claim is:—

1. A process for the production of valuable hydrocarbons from liquid carbonaceous materials, which contain compounds of sulphur or oxygen or both, which comprises first removing the said compounds of oxygen and sulphur by heating the initial materials at a temperature between about 300° and 450° C. without the addition of hydrogen in the presence of a catalyst comprising a metal from the class consisting of the metals of the 6th and 7th groups of the periodic system and cobalt under such pressure that the main portion of the initial materials remains liquid and then subjecting the resulting hydrocarbon products to a cracking treatment at temperatures between 350° and 650° C.

2. A process for the production of valuable hydrocarbons from liquid carbonaceous materials, which contain compounds of sulphur or oxygen or both, which comprises first removing the said compounds of oxygen and sulphur by heating the initial materials at a temperature of between about 300° C. and 450° C. without the addition of hydrogen in the presence of a catalyst comprising a metal from the class consisting of the metals of the 6th and 7th groups of the periodic system and cobalt under such pressure that the main portion of the initial materials remains liquid, the said operation being carried out under such conditions that no substantial disruption of the hydrocarbon constituents of the material takes place, and then subjecting the resulting hydrocarbon products to a cracking treatment at temperatures between 350° and 650° C.

3. A process for the production of valuable hydrocarbons from liquid carbonaceous materials, which contain compounds of sulphur or oxygen or both, which comprises first removing the said compounds of oxygen and sulphur by heating the initial materials at a temperature between about 300° and 450° C. in the presence of a catalyst comprising a metal from the class consisting of the metals of the 6th and 7th groups of the periodic system and cobalt under such pressure that the main portion of the initial materials remains liquid and in the presence of a gas free from hydrogen and gases supplying hydrogen under the conditions of working, and then subjecting the resulting hydrocarbon products to a cracking treatment at temperatures between 350° and 650° C.

4. A process for the production of valuable hydrocarbons from liquid carbonaceous materials, which contain compounds of sulphur or oxygen or both, which comprises first removing the said compounds of oxygen and sulphur by heating the initial materials at a temperature between about 300° and 450° C. without the addition of hydrogen in the presence of a catalyst comprising a metal from the class consisting of the 6th and 7th groups of the periodic system and cobalt, which catalyst is immune from poisoning by sulphur, under such pressure that the main portion of the initial materials remains liquid and then subjecting the resulting hydrocarbon products to a cracking treatment at temperatures between 350° and 650° C.

5. A process for the production of valuable hydrocarbons from liquid carbonaceous materials, which contain compounds of sulphur or oxygen or both, which comprises first removing the said compounds of oxygen and sulphur by heating the initial materials at a temperature of between about 300° C. and 450° C. without the addition of hydrogen in the presence of a catalyst comprising a metal from the class consisting of the metals of the 6th and 7th groups of the periodic system and cobalt, which catalyst is immune from poisoning by sulphur, under such pressure that the main portion of the initial materials remains liquid, the said operation being carried out under such conditions that no substantial disruption of the hydrocarbon constituents of the material takes place, and then subjecting the resulting hydrocarbon products to a cracking treatment.

6. A process for the production of valuable hydrocarbons from liquid carbonaceous materials, which contain compounds of sulphur or oxygen or both, which comprises first removing the said compounds of oxygen and sulphur by heating the initial materials at a temperature of between about 300° C. and 450° C. in the presence of a catalyst comprising a metal from the class consisting of the metals of the 6th and 7th groups of the periodic system and cobalt and in the absence of a gas containing uncombined hydrogen or supplying it under the conditions of working under such pressure that the main portion of the initial materials remains liquid, and then subjecting the resulting hydrocarbon products to a cracking treatment at temperatures between 350° and 650° C.

7. A process for the production of valuable hydrocarbons from liquid carbonaceous materials, which contain compounds of sulphur or oxygen or both, which comprises first removing the said compounds of oxygen and sulphur by heating the initial materials without the addition of hydrogen in the presence of a catalyst comprising a metal from the class consisting of the metals of the 6th and 7th groups of the periodic system and cobalt under pressures of between 1 and 150 atmospheres to temperatures of between 300° and 450° C. and then subjecting the resulting hydrocarbon products to a cracking treatment at temperatures between 350° and 650° C.

8. A process for the production of valuable hydrocarbons from liquid carbonaceous materials, which contain compounds of sulphur or oxygen or both, which comprises first removing the said compounds of oxygen and sulphur by heating the initial materials without the addition of hydrogen in the presence of a catalyst comprising a metal from the class consisting of the metals of the 6th and 7th groups of the periodic system and cobalt under pressures of between 1 and 150 atmospheres to temperatures of between 300° and 450° C., the said operation being carried out under such conditions that no substantial disruption of the hydrocarbon constituents of the material takes place, and then subjecting the resulting hydrocarbon products to a cracking treatment at temperatures between 350° and 650° C.

9. A process for the production of valuable hydrocarbons from liquid carbonaceous materials, which contain compounds of sulphur or oxygen or both, which comprises first removing the said compounds of oxygen and sulphur by heating the initial materials in the presence of a catalyst comprising a metal from the class consisting of the metals of the 6th and 7th groups of the periodic system and cobalt under pressures of between 1 and 150 atmospheres to temperatures of between 300° and 450° C. and in the presence of a gas free from hydrogen and gases supplying hydrogen under the conditions of working, and then subjecting the resulting hydrocarbon products to a cracking treatment at temperatures between 350° and 650° C.

10. A process for the production of valuable hydrocarbons from liquid carbonaceous materials, which contain compounds of sulphur or oxygen or both, which comprises first removing the said compounds of oxygen and sulphur by heating the initial materials without the addition of hydrogen in the presence of a catalyst comprising a metal from the class consisting of the metals of the 6th and 7th groups of the periodic system and cobalt which catalyst is immune from poisoning by sulphur under pressures of between 1 and 150 atmospheres to temperatures of between 300° and 450° C. and then subjecting the resulting hydrocarbon products to a cracking treatment at temperatures between 350° and 650° C.

11. A process for the production of valuable hydrocarbons from liquid carbonaceous materials, which contain compounds of sulphur or oxygen or both, which comprises first removing the said compounds of oxygen and sulphur by heating the initial materials without the addition of hydrogen in the presence of a catalyst comprising a metal from the class consisting of the metals of the 6th and 7th groups of the periodic system and cobalt, which catalyst is immune from poisoning by sulphur under pressures of between 1 and 150 atmospheres to temperatures of between 300° and 450° C., the said operation being carried out under such conditions that no substantial disruption of the hydrocarbon constituents of the material takes place, and then subjecting the resulting hydrocarbon products to a cracking treatment.

12. A process for the production of valuable hydrocarbons from liquid carbonaceous materials, which contain compounds of sulphur or oxygen or both, which comprises first removing the said compounds of oxygen and sulphur by heating the initial materials in the presence of a catalyst comprising a metal from the class consisting of the metals of the 6th and 7th groups of the periodic system and cobalt and in the absence of a gas containing uncombined hydrogen or supplying it under the conditions of working under pressures of between 1 and 150 atmospheres to temperatures of between 300° and 450° C. and then subjecting the resulting hydrocarbon products to a cracking treatment at temperatures between 350° and 650° C.

13. A process for the production of gasoline from gas oil containing compounds of sulphur, which comprises treating the said initial material under a pressure of 100 atmospheres and at a temperature of about 400° C. with ammonia in the presence of a catalyst comprising molybdenum and zinc and cracking the hydrocarbon product thus obtained at a temperature of between 440° and 460° C.

MATHIAS PIER.